(12) United States Patent
Takahashi et al.

(10) Patent No.: US 12,132,414 B2
(45) Date of Patent: Oct. 29, 2024

(54) POWER SUPPLY, CONTROL PROGRAM, AND CONTROL METHOD

(71) Applicant: METAWATER Co., Ltd., Tokyo (JP)

(72) Inventors: Kazuya Takahashi, Tokyo (JP);
Souichirou Yamamoto, Tokyo (JP);
Kyohei Yamamoto, Tokyo (JP);
Yoshitaka Yonetani, Tokyo (JP)

(73) Assignee: METAWATER Co., Ltd., Tokyo (JP)

( * ) Notice: Subject to any disclaimer, the term of this patent is extended or adjusted under 35 U.S.C. 154(b) by 659 days.

(21) Appl. No.: 17/310,962

(22) PCT Filed: Feb. 20, 2020

(86) PCT No.: PCT/JP2020/006921
§ 371 (c)(1),
(2) Date: Sep. 2, 2021

(87) PCT Pub. No.: WO2020/179484
PCT Pub. Date: Sep. 10, 2020

(65) Prior Publication Data
US 2022/0048769 A1 Feb. 17, 2022

(30) Foreign Application Priority Data
Mar. 6, 2019 (JP) .................................. 2019-040708

(51) Int. Cl.
*H02M 7/48* (2007.01)
*H02M 7/539* (2006.01)
(Continued)

(52) U.S. Cl.
CPC ......... *H02M 7/4815* (2021.05); *H02M 7/539* (2013.01); *C01B 13/115* (2013.01); *H02M 1/0048* (2021.05); *H02M 7/4818* (2021.05)

(58) Field of Classification Search
CPC ............. C01B 13/115; C01B 2201/90; H02M 1/0048; H02M 1/0064; H02M 5/458;
(Continued)

(56) References Cited

U.S. PATENT DOCUMENTS

2007/0205727 A1* 9/2007 Tamita .............. H01J 37/32348
315/291
2016/0234921 A1* 8/2016 Tabata .................... C01B 13/11
(Continued)

FOREIGN PATENT DOCUMENTS

JP 4909209 B2 4/2012
JP 2014189455 A 10/2014
(Continued)

OTHER PUBLICATIONS

Tang, X. et al., "A Wide-Range Frequency Model for Dielectric Barrier Discharge Type Ozone Generators Powered by Series Resonant Inverters," in IEEE Access, vol. 7, pp. 124309-124314, 2019, doi: 10.1109/ACCESS.2019.2901718. (Year: 2019).*
(Continued)

*Primary Examiner* — Fred E Finch, III
(74) *Attorney, Agent, or Firm* — KENJA IP LAW PC

(57) ABSTRACT

A power supply that supplies power to a capacitive load comprises: a converter; an inverter; a resonant transformer; a detector configured to detect output frequency or output current and output voltage; and a controller configured to control the inverter, wherein the controller is configured to: calculate output power; adjust the output frequency within a predetermined frequency search range, adjust the output voltage within a predetermined voltage search range, and specify, as a frequency target value, a minimum value of the output frequency with which the output power reaches predetermined output power; and control the inverter so that the output frequency will be the frequency target value,
(Continued)

adjust the output voltage within the predetermined voltage search range, and specify, as a voltage target value, a value of the output voltage with which the output power is target output power.

7 Claims, 8 Drawing Sheets

(51) Int. Cl.
    *C01B 13/11*     (2006.01)
    *H02M 1/00*     (2007.01)

(58) Field of Classification Search
    CPC ............... H02M 5/4585; H02M 7/48; H02M 7/4811–4826; H02M 7/537–5395
    See application file for complete search history.

(56) References Cited

U.S. PATENT DOCUMENTS

| | | | |
|---|---|---|---|
| 2016/0234923 A1* | 8/2016 | Tabata | ................... C01B 13/11 |
| 2016/0234925 A1 | 8/2016 | Tabata et al. | |
| 2020/0252002 A1* | 8/2020 | Takemoto | ......... H02M 7/53878 |

FOREIGN PATENT DOCUMENTS

| | | |
|---|---|---|
| JP | 2016213996 A | 12/2016 |
| JP | 2018121436 A | 8/2018 |
| JP | 2019022378 A | 2/2019 |
| WO | 2008074767 A2 | 6/2008 |

OTHER PUBLICATIONS

May 26, 2020, International Search Report issued in the International Patent Application No. PCT/JP2020/006921.

Aug. 25, 2021, International Preliminary Report on Patentability issued in the International Patent Application No. PCT/JP2020/006921.

Mar. 22, 2023, Office Action issued by the Korean Intellectual Property Office in the corresponding Korean Patent Application No. 10-2021-7026504.

Oct. 18, 2022, the Extended European Search Report issued by the European Patent Office in the corresponding European Patent Application No. 20766464.0.

* cited by examiner

POWER SUPPLY, CONTROL PROGRAM, AND CONTROL METHOD

TECHNICAL FIELD

The present disclosure relates to a power supply, a control program, and a control method.

BACKGROUND

Power supplies that supply power to capacitive loads are conventionally known. For example, JP 4909209 B2 (PTL 1) discloses a power supply for discharge tubes that converts an input alternating-current power source into high-frequency alternating current and outputs the high-frequency alternating current to a discharge tube which is a capacitive load.

CITATION LIST

Patent Literature

PTL 1: JP 4909209 B2

SUMMARY

Technical Problem

As a capacitive load, for example, an ozone generator including a discharge tube that performs silent discharge is known. The ozone generation amount is proportional to the discharge amount of the discharge tube, and the discharge amount depends on the output voltage and output frequency of a power supply that drives the ozone generator. The discharge tube does not discharge unless the applied voltage (i.e. the output voltage of the power supply) is greater than or equal to a predetermined value. Meanwhile, dielectric breakdown occurs if the applied voltage is excessively high. Moreover, since the number of discharge tubes is selected depending on the applied ozone generation amount, the capacitance varies depending on the applied ozone generation amount.

To drive such an ozone generator, a high-frequency high-voltage resonance type power supply is commonly used. The high-frequency high-voltage resonance type power supply typically includes a converter, an inverter, and a resonant transformer (leakage transformer). The converter converts alternating current from a commercial alternating-current power source into direct current. The inverter converts the direct current from the converter into alternating current higher in frequency than the commercial alternating-current power source. The resonant transformer has its primary side connected to the inverter and its secondary side connected to the ozone generator, boosts the alternating current from the inverter and outputs it.

The output power $P_f$ in the case of driving the ozone generator with frequency f is expressed by the following Eqn. (1):

[Eqn. 1]

$$Pf = 4fC_g V_z \left\{ V_p - \left(1 + \frac{C_a}{C_g}\right) V_z \right\}, \quad (1)$$

where $C_a$ and $C_g$ are respectively the capacitances of the air gap part and the dielectric part between the electrodes of the ozone generator, $V_z$ is the discharge-sustaining voltage of the ozone generator, and $V_p$ is the output voltage of the power supply. Once the specifications of the ozone generator are determined, $C_a$, $C_g$, and $V_z$ are constants. Hence, the output power $P_f$ of the power supply is proportional to the product of the output frequency f and the output voltage $V_p$ ($P_f \propto f \times V_p$).

For power factor improvement, the power supply typically drives an ozone generator with the resonant frequency of the leakage inductance L resulting from the windings of the resonant transformer and the average capacitance $C=C_g (1-V_z/V_p)$ determined according to the number of discharge tubes of the ozone generator. The resonant frequency $f_0$ is expressed by the following Eqn. (2):

[Eqn. 2]

$$f_0 = \frac{1}{2\pi\sqrt{LC}}. \quad (2)$$

Consider the case where the change in the capacitance C of an ozone generator is responded to by one power supply in which the inductance L of its resonant transformer is fixed. The applied ozone generation amount is proportional to the capacitance C. In such a case, since the inductance L of the resonant transformer is constant, when the capacitance C of the ozone generator changes with applied ozone generation amount, the output power $P_f$ of the power supply needs to be changed, too. However, if the output power $P_f$ changes, the conduction loss of the inverter and the copper loss of the resonant transformer each changes in proportion to the square of the current, and the resonant frequency $f_0$ changes as well, as is clearly indicated by Eqn. (2). Changing the output frequency according to the resonant frequency $f_0$ changes the switching loss of the inverter and the iron loss of the resonant transformer in the power supply in proportion to the output frequency. In the case where the change in the loss of the inverter or the resonant transformer is large relative to the change in the capacitance C of the ozone generator, with one power supply it is impossible to respond to the change in the capacitance C of the ozone generator according to the applied ozone generation amount.

Thus, a power supply capable of responding to a change in the capacitance C of the capacitive load while maintaining the inductance L of the resonant transformer constant, that is, a versatile power supply capable of responding to a change in the specifications of the capacitive load to which the power supply is applied, is difficult to be realized. Conventionally, power supplies with fixed output frequencies are designed and manufactured to respond to different capacitive load specifications, which causes an increase in the costs of the power supplies.

It could therefore be helpful to improve the versatility of a power supply that supplies power to a capacitive load.

Solution to Problem

A power supply according to one of the disclosed embodiments is a power supply that supplies power to a capacitive load, the power supply including: a converter configured to convert alternating current from an alternating-current power source into direct current; an inverter configured to convert the direct current from the converter into alternating current; a resonant transformer configured to boost the alternating current from the inverter, and output the boosted alternating current to the capacitive load; a detector configured to detect the output frequency or output current and output voltage of the alternating current output to the capacitive load; and a controller configured to control the inverter, wherein the controller is configured to: calculate the output power of the alternating current output to the capacitive load, based on the detection result of the detector; perform a frequency specifying process of adjusting the output frequency within a predetermined frequency search range, adjusting the output voltage within a predetermined voltage search range, and specifying, as a frequency target value, the minimum value of the output frequency with which the output power reaches a predetermined output power that is greater than or equal to a target output power; and perform a voltage specifying process of controlling the inverter so that the output frequency will be the frequency target value, adjusting the output voltage within the predetermined voltage search range, and specifying, as a voltage target value, the value of the output voltage with which the output power is the target output power.

A control program according to one of the disclosed embodiments is a control program for a power supply that supplies power to a capacitive load, the power supply including: a converter configured to convert alternating current from an alternating-current power source into direct current; an inverter configured to convert the direct current from the converter into alternating current; a resonant transformer configured to boost the alternating current from the inverter and output the boosted alternating current to the capacitive load; a detector configured to detect output frequency or output current and output voltage of the alternating current output to the capacitive load; and a controller configured to control the inverter, wherein the control program includes processes to: calculate the output power of the alternating current output to the capacitive load, based on the detection result of the detector; adjust the output frequency within a predetermined frequency search range, adjust the output voltage within a predetermined voltage search range, and specify, as a frequency target value, the minimum value of the output frequency with which the output power reaches a predetermined output power that is greater than or equal to a target output power; and control the inverter so that the output frequency will be the frequency target value, adjust the output voltage within the predetermined voltage search range, and specify, as a voltage target value, the value of the output voltage with which the output power is the target output power.

A control method according to one of the disclosed embodiments is a control method for a power supply that supplies power to a capacitive load, the power supply including: a converter configured to convert alternating current from an alternating-current power source into direct current; an inverter configured to convert the direct current from the converter into alternating current; a resonant transformer configured to boost the alternating current from the inverter, and output the boosted alternating current to the capacitive load; a detector configured to detect output frequency or output current and output voltage of the alternating current output to the capacitive load; and a controller configured to control the inverter, wherein the control method includes steps to: calculate the output power of the alternating current output to the capacitive load, based on the detection result of the detector; adjust the output frequency within a predetermined frequency search range, adjust the output voltage within a predetermined voltage search range, and specify, as a frequency target value, the minimum value of the output frequency with which the output power reaches a predetermined output power that is greater than or equal to a target output power; and control the inverter so that the output frequency will be the frequency target value, adjust the output voltage within the predetermined voltage search range, and specify, as a voltage target value, the value of the output voltage with which the output power is the target output power.

Advantageous Effect

It is thus possible to improve the versatility of a power supply that supplies power to a capacitive load.

DETAILED DESCRIPTION

One of the disclosed embodiments will be described below.

Figure 1:
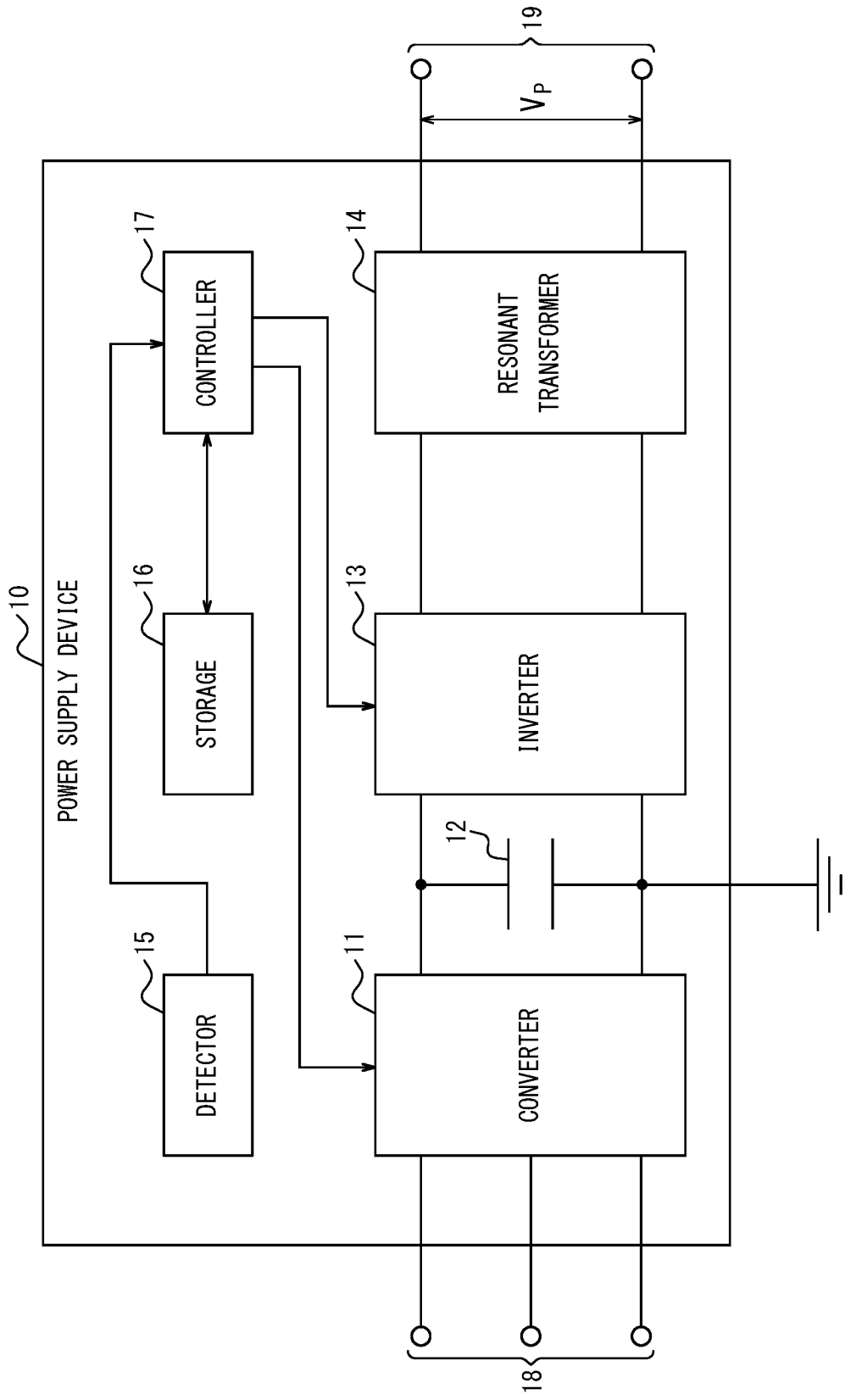
FIG. 1 is a block diagram illustrating the schematic structure of a power supply according to one of the disclosed embodiments.

A power supply 10 according to one of the disclosed embodiments will be described below, with reference to FIG. 1. The power supply 10 is used to supply power to a capacitive load. This embodiment describes the case where the capacitive load is an ozone generator including one or more discharge tubes that perform silent discharge. The capacitive load is, however, not limited to an ozone generator. The power supply 10 includes a converter 11, a capacitor 12, an inverter 13, a resonant transformer 14, a detector 15, a storage 16, and a controller 17, as illustrated in FIG. 1. The power supply 10 has an input terminal 18 connected to a commercial power source, and an output terminal 19 connected to an ozone generator. Although the power supply 10 corresponds to a three-phase alternating-current commercial power source in the example illustrated in FIG. 1, the power supply 10 is not limited to such, and may correspond to a single-phase alternating-current commercial power source. The input terminal 18 of the power supply 10 may be connected to any alternating-current power source not limited to a commercial power source.

The converter 11 converts alternating current from the commercial power source connected to the input terminal 18, into direct current. The capacitor 12 smooths the output voltage of the converter 11. The inverter 13 converts the direct current from the converter 11 into high-frequency alternating current higher in frequency than the commercial power source. A switching element of the inverter 13 is, for example, an IGBT, but is not limited to such. The resonant transformer 14 has its primary side connected to the inverter 13, and its secondary side connected to the ozone generator via the output terminal 19. The resonant transformer 14 boosts the alternating current from the inverter 13, and outputs the boosted alternating current to the ozone generator via the output terminal 19. The resonant transformer 14 is, for example, a leakage transformer, but is not limited to such.

The detector 15 includes, for example, a frequency detection circuit or a current detection circuit and a voltage detection circuit. The detector 15 is included in the power supply 10 so as to be capable of detecting the output frequency f or the output current I and the output voltage $V_p$ of the alternating current output from the inverter 13 to the ozone generator via the output terminal 19. In this embodiment, the output frequency f of the power supply 10 is the frequency on the output terminal 19 from the inverter 13. The output current I of the power supply 10 is the current output from the output terminal 19 to the ozone generator. The output voltage $V_p$ of the power supply 10 is the voltage on the output terminal 19 side (the secondary side of the resonant transformer 14) from the resonant transformer 14.

The storage 16 includes one or more memories. Examples of the one or more memories include semiconductor memory, magnetic memory, and optical memory. The one or more memories are not limited to such, and may be any memory. The storage 16 stores any information used for the operation of the power supply 10.

In this embodiment, the storage 16 stores a predetermined frequency search range and a predetermined voltage search range.

The predetermined frequency search range is a frequency range determined based on the manufacturing error of the inductance L of the resonant transformer 14 and the manufacturing error of the capacitance C of the ozone generator. In more detail, the predetermined frequency search range is a range in which the resonant frequency $f_0$ that resonates the inductance component of the resonant transformer 14 and the capacitance component of the ozone generator is changeable due to the manufacturing error of the inductance L of the resonant transformer 14 and the manufacturing error of the capacitance C of the ozone generator. For example, the predetermined frequency search range may be calculated using the manufacturing error range ±ΔL of the inductance L and the manufacturing error range ±ΔC of the capacitance C, or calculated as a predetermined frequency range (for example, ±10%) centering on the resonant frequency $f_0$ when the manufacturing error is assumed to be zero.

The predetermined voltage search range is a range of voltage applicable to the ozone generator determined based on the specifications of the ozone generator and the manufacturing error of the capacitance C of the ozone generator.

For example, the predetermined frequency search range and the predetermined voltage search range may be stored in the storage 16 beforehand, or automatically calculated by the controller 17 and stored in the storage 16.

The controller 17 includes one or more processors. Examples of the one or more processors include a general-purpose processor and a special-purpose processor specialized for specific processing. The controller 17 controls the overall operation of the power supply 10 (for example, the operation of the inverter 13). The operation of the controller 17 will be described in detail later.

Before the description of the operation of the power supply 10 according to this embodiment, the circumstances leading up to conceiving the presently disclosed techniques will be described below. Conventional techniques have difficulty in realizing a power supply capable of responding to change in the capacitance C of the capacitive load while maintaining the inductance L of the resonant transformer constant, as mentioned above. Through experiments in recent years, we newly discovered the following two points.

Figure 7:
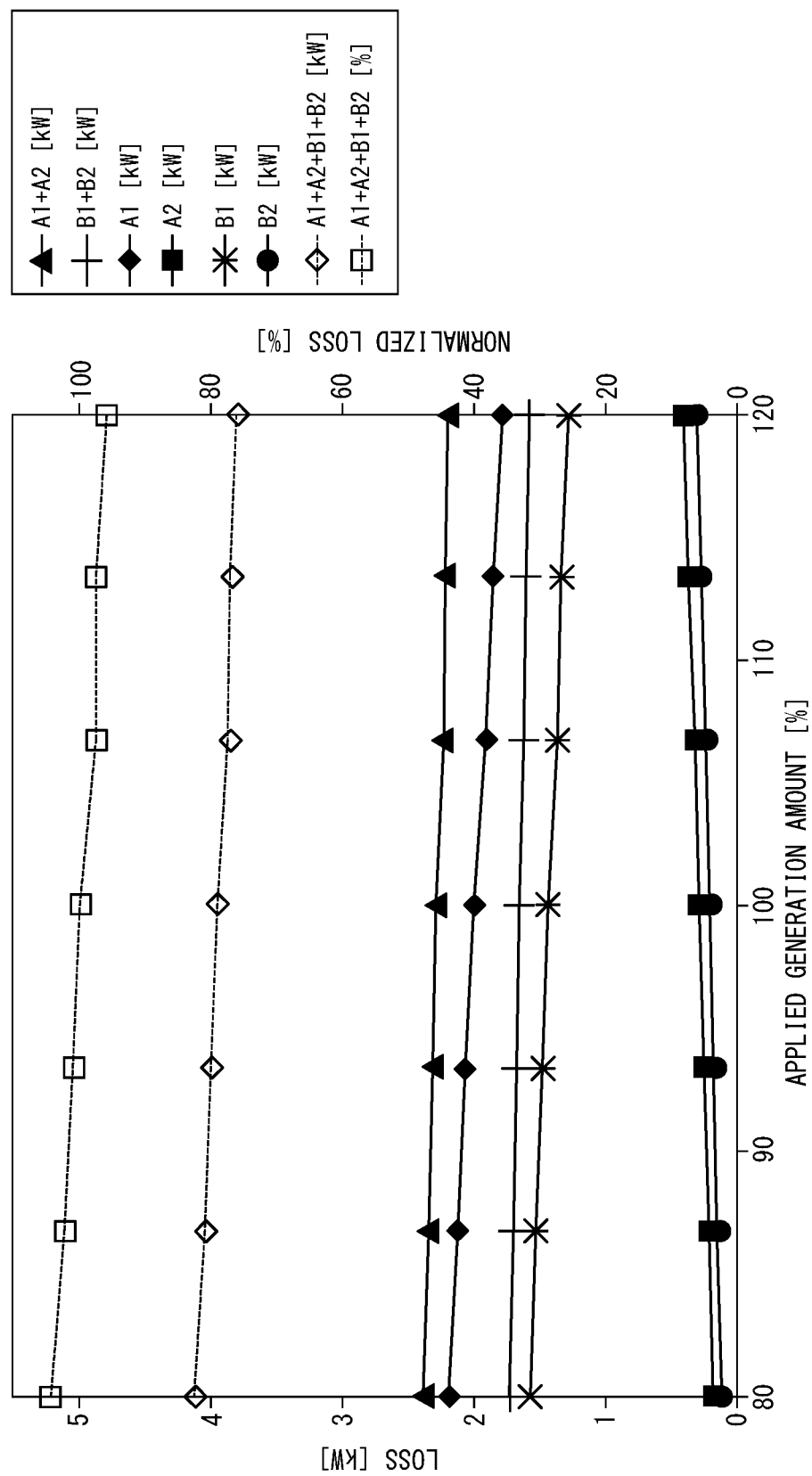
FIG. 7 is a graph illustrating the relationship between the applied ozone generation amount in an ozone generator and the loss and normalized loss in a power supply.

The first discovery is that, in the case where the inductance L of the resonant transformer in the power supply is constant, the change in the loss in the power supply is sufficiently small relative to the change in the capacitance C (or the applied generation amount) of the applied ozone generator. In detail, the loss in the power supply includes a loss component proportional to the frequency (i.e. the switching loss of the inverter and the iron loss+stray load loss of the resonant transformer) and a loss component proportional to the square of the current (i.e. the conduction loss of the inverter and the copper loss of the resonant transformer). For example, when the capacitance C (or the applied generation amount) increases, the resonant frequency decreases but the current increases. FIG. 7 illustrates the change of each loss component in the power supply when the applied generation amount of the ozone generator is changed in a range from 80% to 120%. In FIG. 7, A1 and A2 respectively denote the switching loss and the conduction loss of the inverter, while B1 and B2 respectively denote the iron loss+stray load loss and the copper loss of the resonant transformer. As indicated by "A1+A2+B1+B2 [%]" in FIG. 7, the change in the loss in each of the inverter and the resonant transformer is sufficiently small relative to the change in the applied generation amount (or the capacitance C). This suggests that it is possible for a power supply to respond to the change in the capacitance C of the capacitive load while maintaining the inductance L of its resonant transformer constant. To support various ozone generators that differ in capacitance C, however, it is necessary to make the output frequency f of the power supply adjustable in a relatively wide frequency range and select an appropriate frequency corresponding to the ozone generator. Specifying an appropriate frequency from such a relatively wide frequency range puts heavy workload on the operator, and is impossible in some cases. In view of this, the power supply 10 according to this embodiment is able to automatically determine the appropriate frequency by autotuning, as described later.

Figure 8:
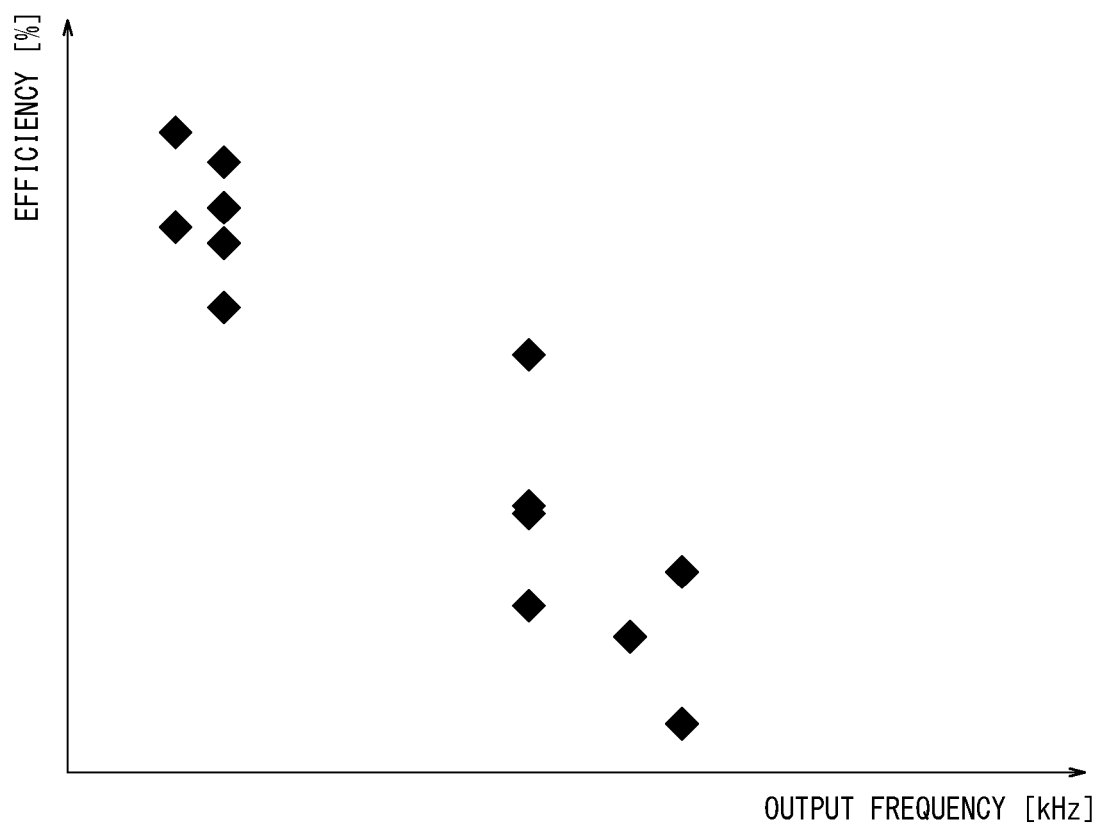
FIG. 8 is a graph illustrating the relationship between the output frequency and the efficiency of a power supply.

The second discovery is that the power output efficiency of the power supply is inversely proportional to the output frequency f. In detail, there is a strong negative correlation between the output frequency f and the efficiency, as illustrated in FIG. 8. This demonstrates that the output efficiency of the power supply is not necessarily maximum in the case of driving the power supply at the resonant frequency $f_0$ to produce maximum output. In view of this, the power supply 10 according to this embodiment determines, by autotuning, the minimum frequency with which the target output power corresponding to the ozone generator can be reached, as described later.

Figure 2:
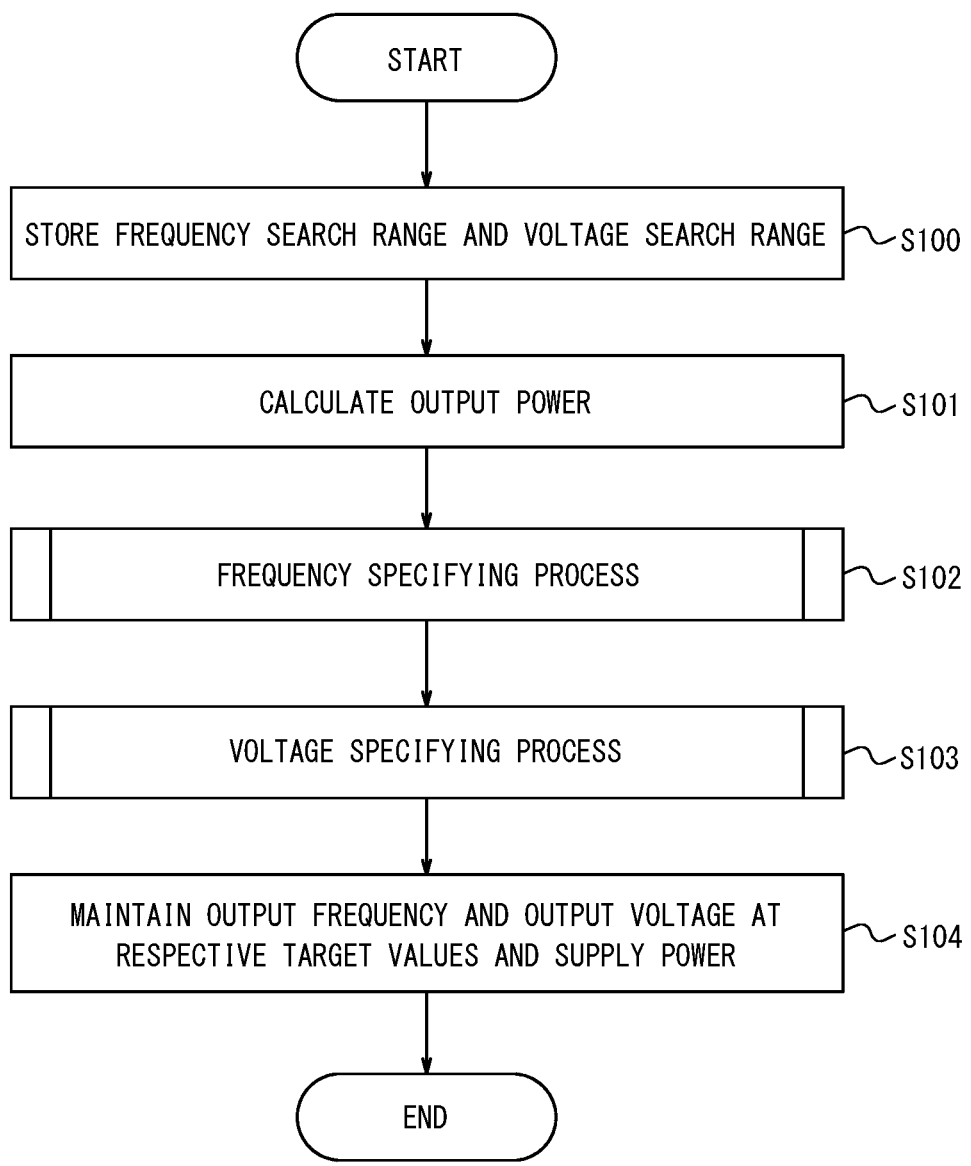
FIG. 2 is a flowchart illustrating the operation of the power supply e.

The operation of the power supply 10 controlled by the controller 17 will be described below, with reference to FIG. 2.

Step S100: the controller 17 stores the predetermined frequency search range and the predetermined voltage search range in the storage 16. For example, the predetermined frequency search range and the predetermined voltage search range may be directly input by the operator, or automatically calculated by the controller 17 based on information of the specifications of each of the ozone generator and the power supply 10 input by the operator.

Step S101: the controller 17 calculates the output power $P_f$ based on the detection result of the detector 15 (i.e. the output frequency f or the output current I and the output voltage $V_p$ detected by the detector 15). From step S101 onward, the controller 17 can recognize the output power $P_f$ approximately in real time.

Step S102: the controller 17 performs a frequency specifying process. In summary, the frequency specifying process is a process of adjusting the output frequency f within the predetermined frequency search range, adjusting the output voltage $V_p$ within the predetermined voltage search range and specifying, as a frequency target value, the minimum value of the output frequency f with which the output power $P_f$ reaches predetermined output power that is greater than or equal to the target output power of the power supply 10 (described in detail later). For example, the predetermined output power may be equal to the target output power. Alternatively, the predetermined output power may be greater than the target output power, given that the discharge power of the discharge tube in the ozone generator is less than the output power $P_f$ of the power supply 10.

Step S103: the controller 17 performs a voltage specifying process. In summary, the voltage specifying process is a process of controlling the inverter 13 so that the output frequency f will be the frequency target value, adjusting the output voltage $V_p$ within the predetermined voltage search range, and specifying, as a voltage target value, the value of the output voltage $V_p$ with which the output power $P_f$ is the target output power (described in detail later).

Step S104: the controller 17 maintains the output frequency f and the output voltage $V_p$ respectively at the frequency target value and the voltage target value, and supplies power to the ozone generator. The process then ends.

Figure 3:
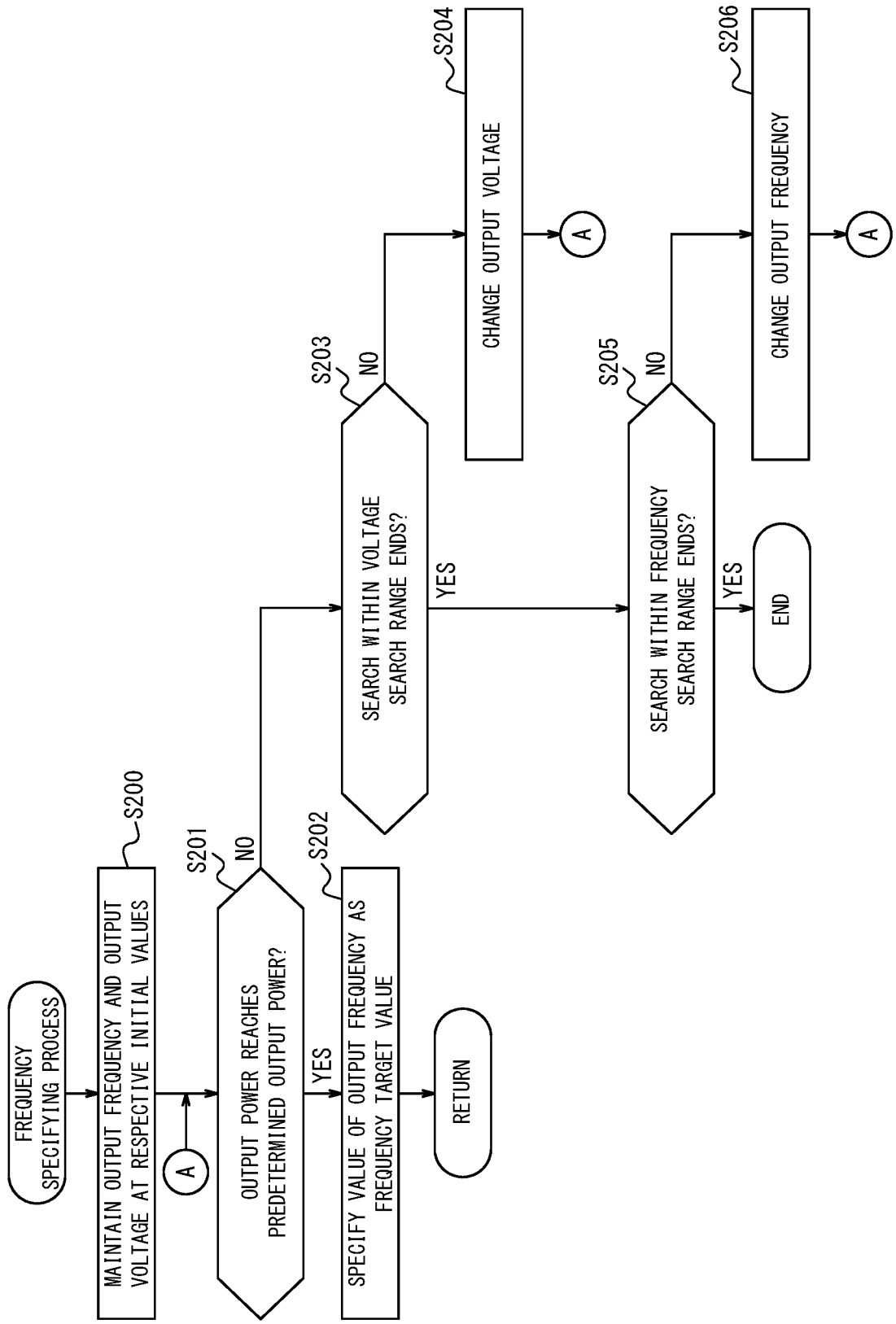
FIG. 3 is a flowchart illustrating the operation of the power supply in a frequency specifying process in FIG. 2.

The frequency specifying process in Step S102 will be described in detail below, with reference to FIG. 3. In this embodiment, a method (step-up tuning) of specifying the frequency target value while incrementing the output frequency f by a predetermined value is used. However, the frequency specifying process is not limited to such, and any method may be used. Since the pulse intermittence becomes a disturbance element, the controller 17 performs the frequency specifying process in a state in which the pulse density is 100% (full pulse) by PDM control of the inverter 13. Moreover, the controller 17 performs the frequency specifying process while controlling the output voltage $V_p$ not to exceed the breakdown voltage of the ozone generator by PWM control of the inverter 13.

Step S200: the controller 17 maintains the output frequency f and the output voltage $V_p$ at their respective initial values. In this embodiment, the initial value of the output frequency f is the lower limit of the predetermined frequency search range, and the initial value of the output voltage $V_p$ is the lower limit of the predetermined voltage search range.

Step S201: the controller 17 determines whether the output power $P_f$ reaches the predetermined output power (for example, 110% of the target output power) greater than or equal to the target output power of the power supply 10. In the case where the controller 17 determines that the output power $P_f$ has not reached the predetermined output power (step S201: No), the process advances to step S203. In the case where the controller 17 determines that the output power $P_f$ has reached the predetermined output power (step S201: Yes), the process advances to step S202.

Step S202: the controller 17 specifies the value of the output frequency f as the frequency target value. The frequency specifying process ends, and the process advances to the foregoing step S103.

Step S203: the controller 17 determines whether the search within the predetermined voltage search range ends (in this embodiment, whether the output voltage $V_p$ has reached the upper limit of the predetermined voltage search range). In the case where the controller 17 determines that the search within the predetermined voltage search range has ended (S203: Yes), the process advances to step S205. In the case where the controller 17 determines that the search within the predetermined voltage search range has not ended (S203: No), the process advances to step S204.

Step S204: the controller 17 controls the inverter 13 to change the output voltage $V_p$ (in this embodiment, increase the output voltage $V_p$ by a predetermined value). The process then returns to step S201.

Step S205: the controller 17 determines whether the search within the predetermined frequency search range ends (in this embodiment, whether the output frequency f has reached the upper limit of the predetermined frequency search range). In the case where the controller 17 determines that the search within the predetermined frequency search range has ended (S205: Yes), the process ends on the grounds that, for example, an error such as a failure to determine the frequency target value occurs. In the case where the controller 17 determines that the search within the predetermined frequency search range has not ended (S205: No), the process advances to step S206.

Step S206: the controller 17 controls the inverter 13 to change the output frequency f (In this embodiment, increase the output frequency f by a predetermined value). The process then returns to step S201.

Figure 4:
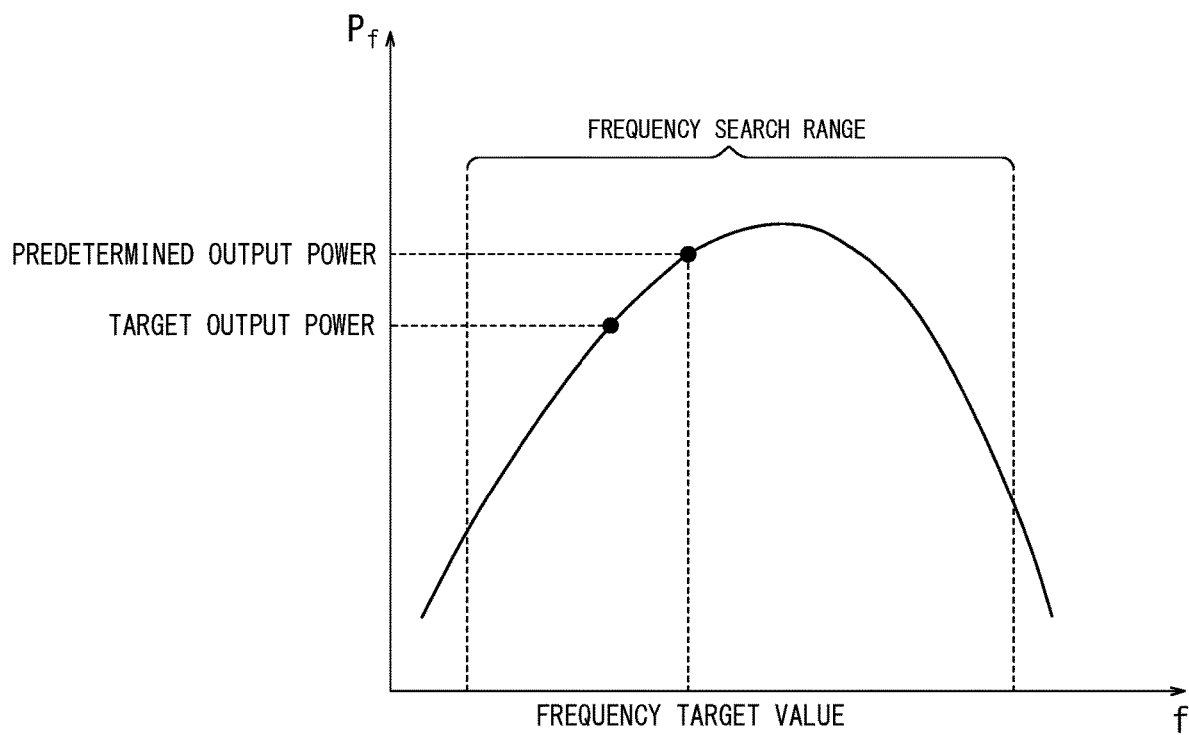
FIG. 4 is a graph illustrating the relationship between the frequency and the output power in the frequency specifying process.

Thus, the frequency specifying process includes: a first process of determining whether the output power $P_f$ has reached the predetermined output power while changing the output voltage $V_p$ with the output frequency f maintained (fixed) (corresponding to steps S200, S201, S203, and S204); a second process of, in the case of determining that the output power $P_f$ has reached the predetermined output power, specifying the value of the output frequency f as the frequency target value (corresponding to step S202); and a third process of, in the case of determining that the output power $P_f$ has not reached the predetermined output power, increasing the output frequency f and returning to the first process (corresponding to step S206). With the frequency specifying process, for example, the minimum value of the output frequency f with which the output power $P_f$ reaches the predetermined output power in the predetermined frequency search range is specified as the frequency target value, as illustrated in FIG. 4. In this embodiment, step-up tuning is used, so that the output frequency f is increased from the lower limit of the predetermined frequency search range, and the value of the output frequency f when the output power $P_f$ first reaches the predetermined output power is specified as the frequency target value.

Figure 5:
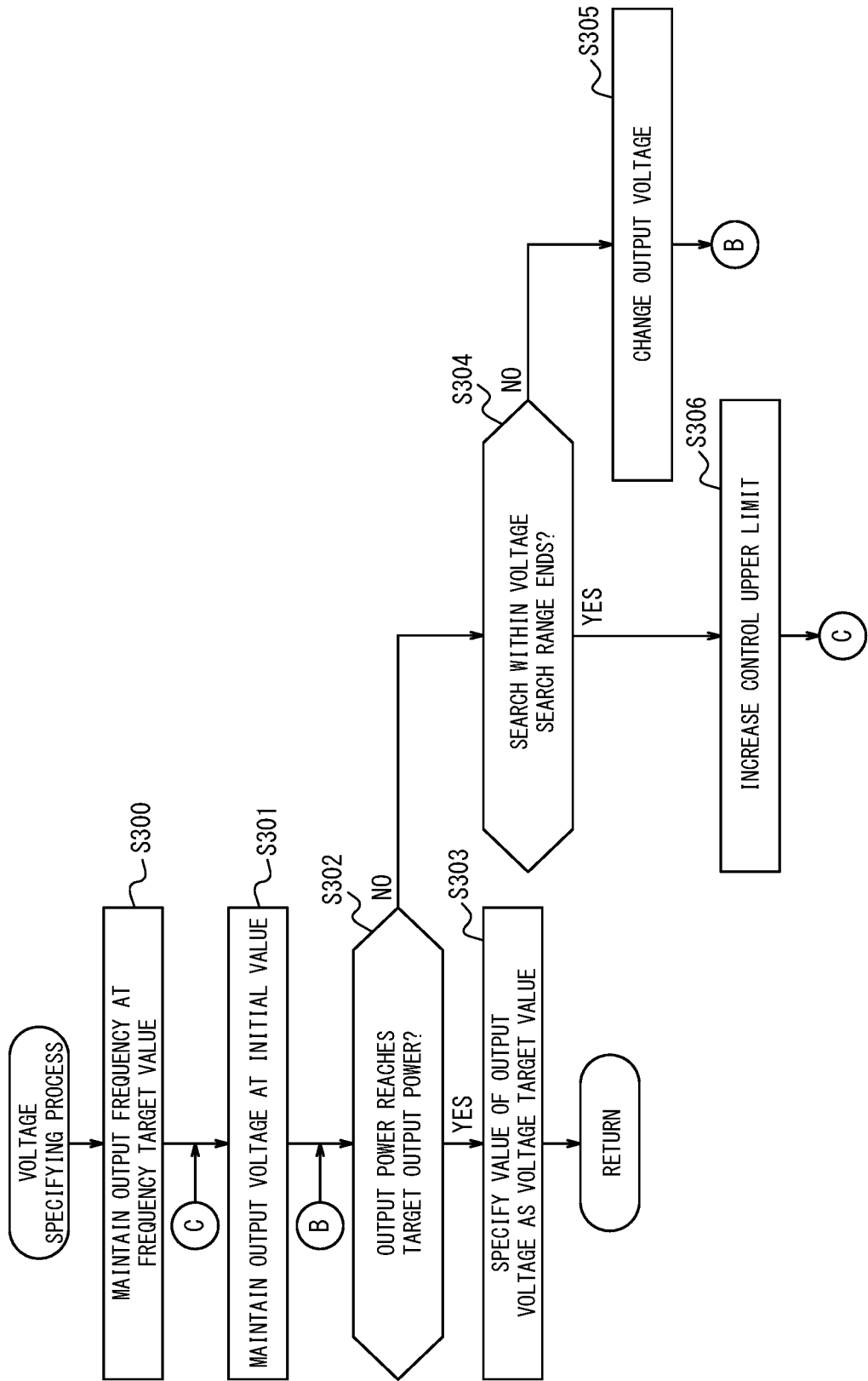
FIG. 5 is a flowchart illustrating the operation of the power supply in a voltage specifying process in FIG. 2.

The voltage specifying process in step S103 will be described in detail below, with reference to FIG. 5. The controller 17 performs the voltage specifying process while controlling the pulse density not to exceed the control upper limit (for example, 95%) lower than 100% by PDM control of the inverter 13.

Step S300: the controller 17 maintains the output frequency f at the frequency target value.

Step S301: the controller 17 maintains the output voltage $V_p$ at the initial value (in this embodiment, the lower limit of the predetermined voltage search range).

Step S302: the controller 17 determines whether the output power $P_f$ has reached the target output power. In the case where the controller 17 determines that the output power $P_f$ has not reached the target output power (step S302: No), the process advances to step S304. In the case where the controller 17 determines that the output power $P_f$ has reached the target output power (step S302: Yes), the process advances to step S303.

Step S303: the controller 17 specifies the value of the output voltage $V_p$ as the voltage target value. The voltage specifying process ends, and the process advances to the foregoing step S104.

Step S304: the controller 17 determines whether the search within the predetermined voltage search range ends (in this embodiment, whether the output voltage $V_p$ has reached the upper limit of the predetermined voltage search range). In the case where the controller 17 determines that the search within the predetermined voltage search range has ended (S304: Yes), the process advances to step S306. In the case where the controller 17 determines that the search within the predetermined voltage search range has not ended (S304: No), the process advances to step S305.

Step S305: the controller 17 controls the inverter 13 to change the output voltage $V_p$ (in this embodiment, increase the output voltage $V_p$ by a predetermined value). The process then returns to step S302.

Step S306: the controller 17 increases the control upper limit of the pulse density by, for example, a predetermined amount. The process then returns to step S301. Thus, the search within the predetermined voltage search range is performed again with the control upper limit of the pulse density increased.

Figure 6:
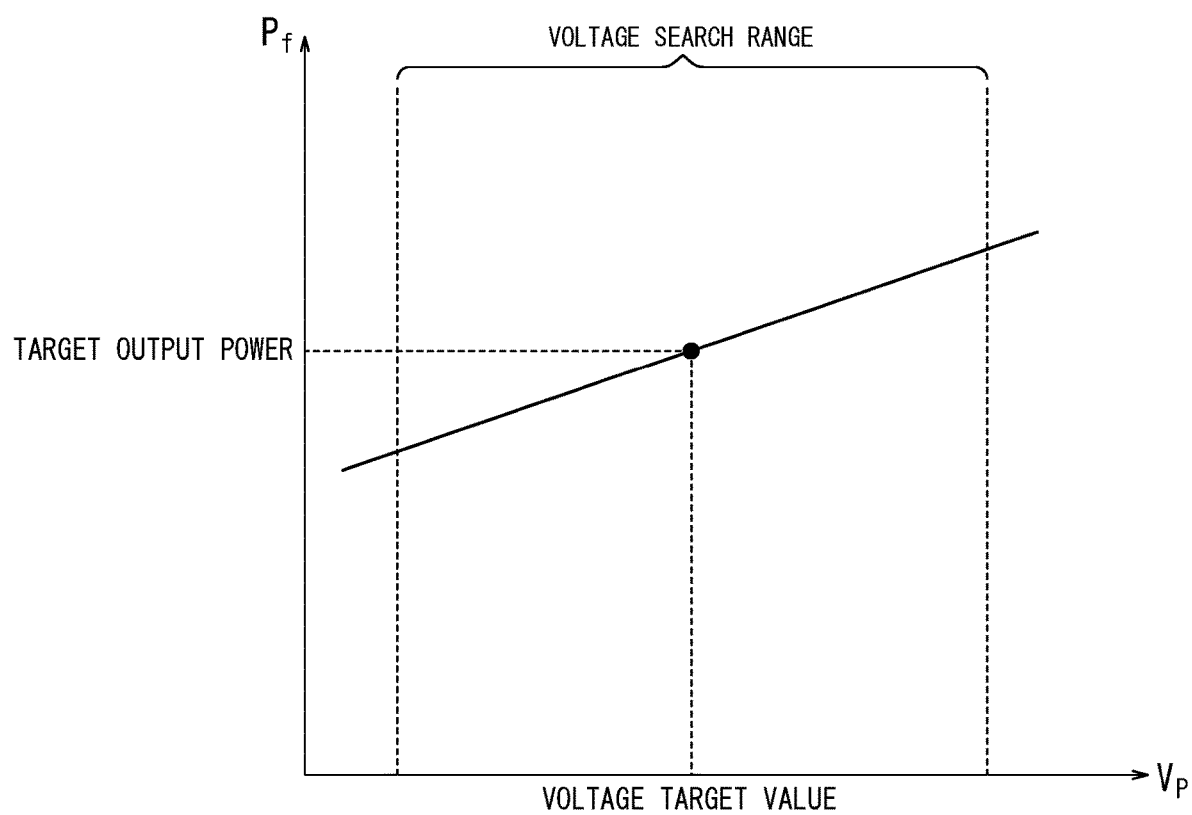
FIG. 6 is a graph illustrating the relationship between the output voltage and the output power in the voltage specifying process.

With the voltage specifying process described above, the value of the output voltage with which the output power $P_f$ is the target output power is specified as the voltage target value in the predetermined voltage search range, for example as illustrated in FIG. 6. Since the output frequency f is maintained at the frequency target value (i.e. the output frequency f is constant) in the voltage specifying process, the output power $P_f$ and the output voltage $V_p$ are in a proportional relationship, as is clear from the foregoing Eqn. (1).

As described above, the power supply 10 according to this embodiment: performs the frequency specifying process of adjusting the output frequency f within the predetermined frequency search range, adjusting the output voltage within the predetermined voltage search range, and specifying, as the frequency target value, the minimum value of the output frequency f with which the output power $P_f$ reaches the predetermined output power; and performs the voltage specifying process of controlling the inverter 13 so that the output frequency f will be the frequency target value, adjusting the output voltage within the predetermined voltage search range, and specifying, as the voltage target value, the value of the output voltage with which the output power $P_f$ is the target output power.

With such a structure, the appropriate frequency corresponding to the applied capacitive load is automatically specified from a relatively wide frequency range, so that the power supply 10 can respond to changes in the specifications of the applied capacitive load. The versatility of the power supply that supplies power to the capacitive load is thus improved. Moreover, since the minimum value of the output frequency f with which the output power $P_f$ reaches the predetermined output power is specified as the frequency target value, the output efficiency of the power supply 10 is improved.

Although the presently disclosed techniques have been described by way of the drawings and examples, various changes and modifications may be easily made by those of ordinary skill in the art based on the present disclosure. Such changes and modifications are therefore included in the scope of the present disclosure. For example, the functions included in the means, steps, etc. may be rearranged without logical inconsistency, and a plurality of means, steps, etc. may be combined into one means, step, etc. and a means, step, etc. may be divided into a plurality of means, steps, etc.

For example, the foregoing embodiment describes a structure in which, in the case where the controller 17 in the power supply 10 determines that the search within the predetermined voltage search range ends (i.e. in the case where the voltage target value cannot be determined even when the output voltage $V_p$ is increased to the upper limit of the predetermined voltage search range) in the voltage specifying process performed by the controller 17, the control upper limit of the pulse density is increased in step S306 to perform the search again. As another embodiment, for example, in the case where the controller 17 determines that the search within the predetermined voltage search range ends, the upper limit of the predetermined voltage search range may be increased by a predetermined amount to continue the search.

A power supply e capable of executing a program may be used to function as the power supply 10 according to the foregoing embodiment. The device can be implemented by storing in a memory in the device, a program for achieving the functions of the power supply 10 according to the foregoing embodiment; reading and executing this program by a processor in the device. The embodiment may be therefore a program executable by a processor.

REFERENCE SIGNS LIST 10 power supply
11 converter
12 capacitor
13 inverter
14 resonant transformer
15 detector
16 storage
17 controller
18 input terminal
19 output terminal

The invention claimed is:

1. A power supply that supplies power to a capacitive load, the power supply comprising:
   a converter configured to convert alternating current from an alternating-current power source into direct current;
   an inverter configured to convert the direct current from the converter into alternating current;
   a resonant transformer configured to boost the alternating current from the inverter, and output the boosted alternating current to the capacitive load;
   a detector configured to detect output frequency or output current and output voltage of the alternating current output to the capacitive load; and
   a controller configured to control the inverter,
   wherein the controller is configured to:
   calculate output power of the alternating current output to the capacitive load, based on a detection result of the detector;

perform a frequency specifying process of adjusting the output frequency within a predetermined frequency search range, adjusting the output voltage within a predetermined voltage search range, and specifying, as a frequency target value, a minimum value of the output frequency with which the output power reaches predetermined output power that is greater than or equal to target output power; and perform a voltage specifying process of controlling the inverter so that the output frequency will be the frequency target value, adjusting the output voltage within the predetermined voltage search range, and specifying, as a voltage target value, a value of the output voltage with which the output power is the target output power.

2. The power supply according to claim 1, wherein the frequency specifying process includes:
- a first process of determining whether the output power reaches the predetermined output power while changing the output voltage in a state in which the output frequency is maintained;
- a second process of specifying a value of the output frequency as the frequency target value, in the case of determining that the output power reaches the predetermined output power; and
- a third process of increasing the output frequency and returning to the first process, in the case of determining that the output power does not reach the predetermined output power.

3. The power supply according to claim 1, wherein the controller is configured to perform the frequency specifying process in a state in which a pulse density is 100%, and perform the voltage specifying process while controlling the pulse density not to exceed a predetermined density lower than 100%, by PDM control of the inverter.

4. The power supply according to claim 1, wherein the predetermined frequency search range is a range in which a frequency that resonates an inductance component of the resonant transformer and a capacitance component of the capacitive load is changeable due to a manufacturing error of inductance of the resonant transformer and a manufacturing error of capacitance of the capacitive load.

5. The power supply according to claim 1, wherein the predetermined voltage search range is a range of voltage applicable to the capacitive load, the range being determined based on specifications of the capacitive load and a manufacturing error of capacitance of the capacitive load.

6. A non-transitory computer memory for a power supply that supplies power to a capacitive load, the power supply including: a converter configured to convert alternating current from an alternating-current power source into direct current; an inverter configured to convert the direct current from the converter into alternating current; a resonant transformer configured to boost the alternating current from the inverter, and output the boosted alternating current to the capacitive load; a detector configured to detect output frequency or output current and output voltage of the alternating current output to the capacitive load; and a controller configured to control the inverter, wherein the non-transitory computer memory stores therein a control program which, when executed by a processor, causes the processor to perform processes to:
- calculate output power of the alternating current output to the capacitive load, based on a detection result of the detector;
- adjust the output frequency within a predetermined frequency search range, adjust the output voltage within a predetermined voltage search range, and specify, as a frequency target value, a minimum value of the output frequency with which the output power reaches predetermined output power that is greater than or equal to target output power; and
- control the inverter so that the output frequency will be the frequency target value, adjust the output voltage within the predetermined voltage search range, and specify, as a voltage target value, a value of the output voltage with which the output power is the target output power.

7. A control method for a power supply that supplies power to a capacitive load, the power supply including: a converter configured to convert alternating current from an alternating-current power source into direct current; an inverter configured to convert the direct current from the converter into alternating current; a resonant transformer configured to boost the alternating current from the inverter, and output the boosted alternating current to the capacitive load; a detector configured to detect output frequency or output current and output voltage of the alternating current output to the capacitive load; and a controller configured to control the inverter, the control method comprising:
- calculating output power of the alternating current output to the capacitive load, based on a detection result of the detector;
- adjusting the output frequency within a predetermined frequency search range, adjusting the output voltage within a predetermined voltage search range, and specifying, as a frequency target value, a minimum value of the output frequency with which the output power reaches predetermined output power that is greater than or equal to target output power; and
- controlling the inverter so that the output frequency will be the frequency target value, adjusting the output voltage within the predetermined voltage search range, and specifying, as a voltage target value, a value of the output voltage with which the output power is the target output power.

* * * * *